United States Patent [19]

Deckler

[11] 4,450,979
[45] May 29, 1984

[54] SEED METERING MEANS

[75] Inventor: Harry C. Deckler, South Bend, Ind.

[73] Assignee: White Farm Equipment Company, Farmington Hills, Mich.

[21] Appl. No.: 424,835

[22] Filed: Sep. 27, 1982

Related U.S. Application Data

[63] Continuation of Ser. No. 178,532, Aug. 15, 1980, abandoned.

[51] Int. Cl.³ .............................................. A01C 7/04
[52] U.S. Cl. .................................... 221/263; 221/278; 222/352
[58] Field of Search .............. 221/211, 278, 217, 266, 221/263; 222/352, 368; 111/77

[56] References Cited

U.S. PATENT DOCUMENTS

| | | | |
|---|---|---|---|
| 3,347,426 | 10/1967 | Morrison et al. | 222/352 |
| 3,715,057 | 2/1973 | Becker | 111/77 |
| 4,047,638 | 9/1977 | Harrer et al. | 221/278 |
| 4,091,964 | 5/1978 | Harrer | 221/278 |

*Primary Examiner*—H. Grant Skaggs
*Attorney, Agent, or Firm*—Lockwood, Dewey, Alex & Cummings

[57] ABSTRACT

Disclosed are improvements in seed metering apparatus for seed planters such as disclosed in applicant's U.S. Pat. Nos. 3,888,387 and 3,999,690. The improvements relate to improved seed pick-up, retention, and release; to a non-wear pneumatic seal between rotating seed disc and housing; and a seed gate.

4 Claims, 12 Drawing Figures

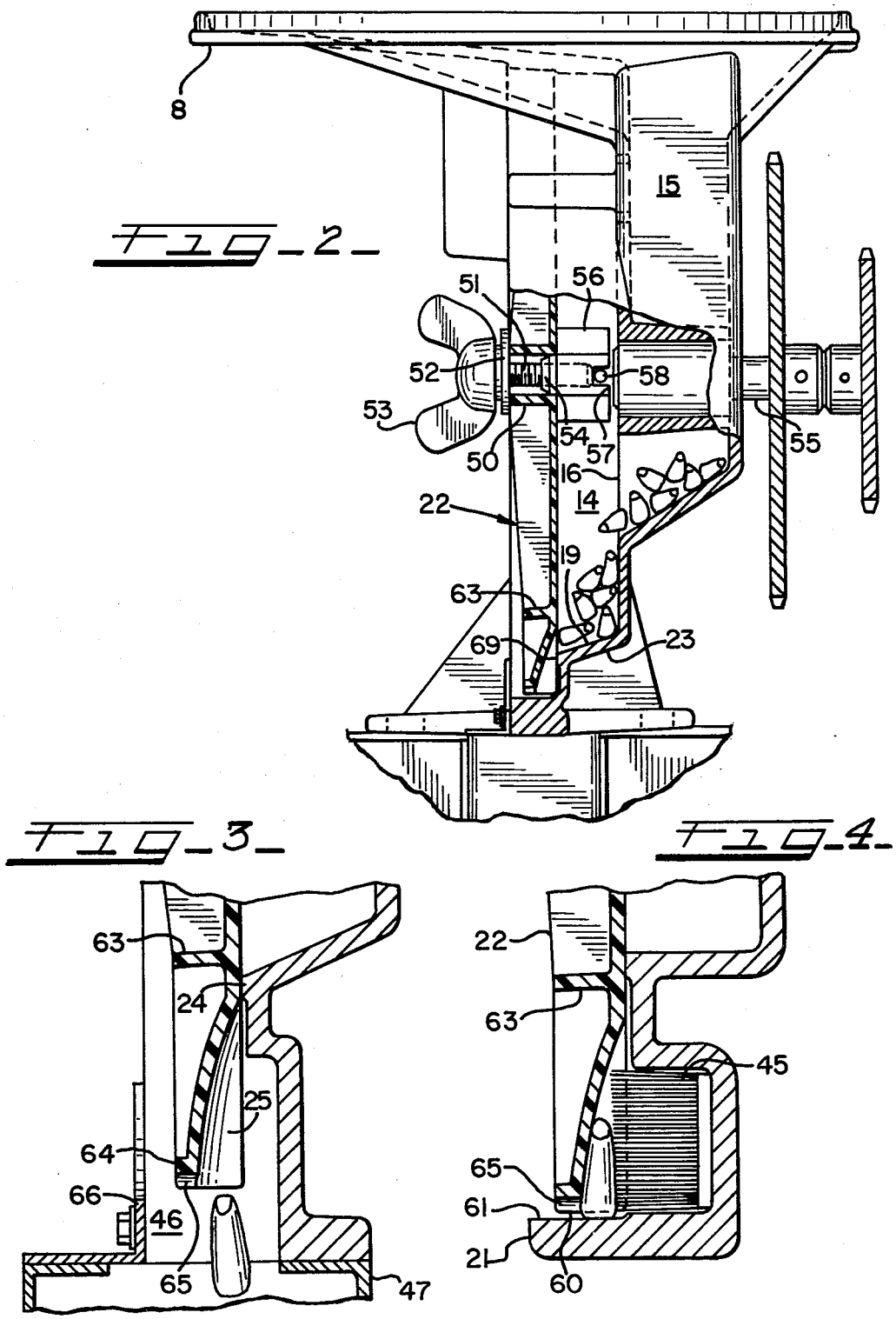

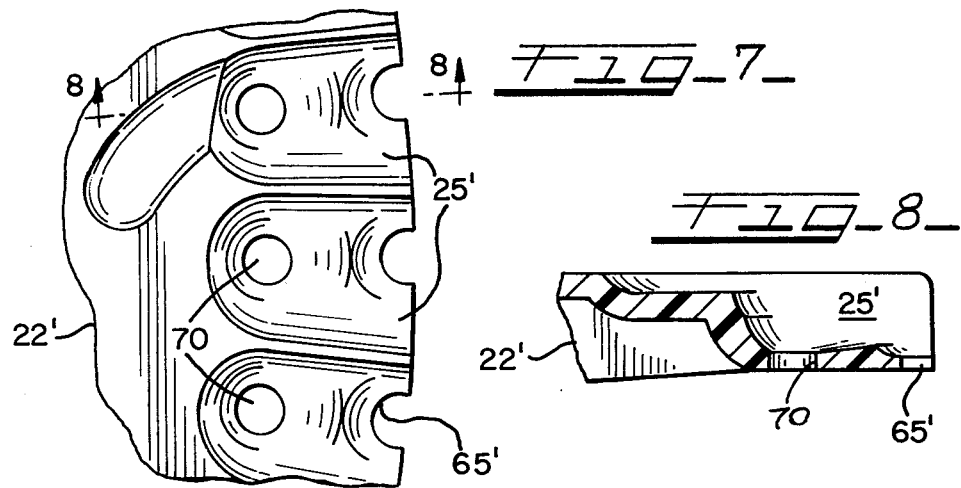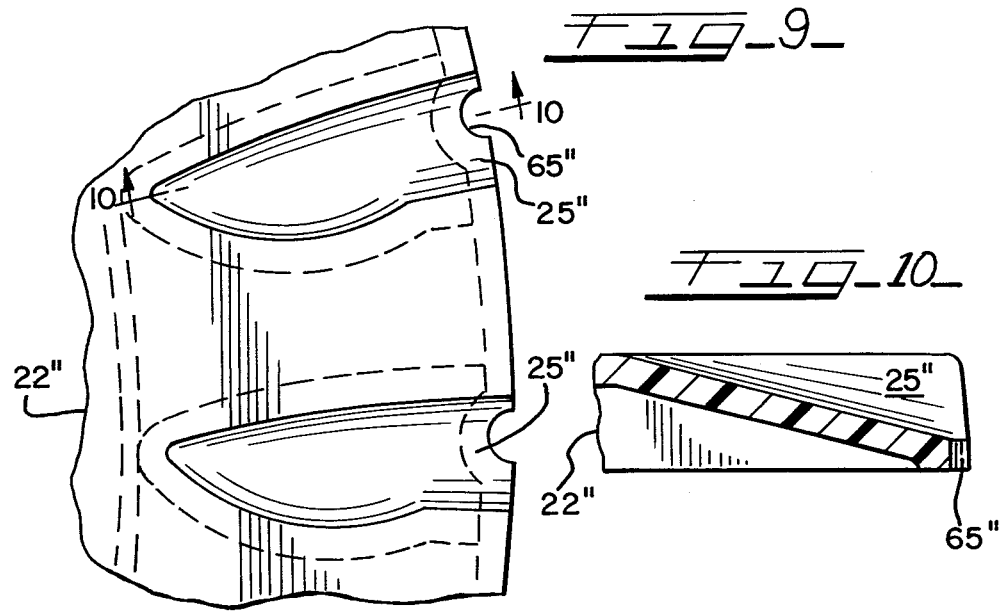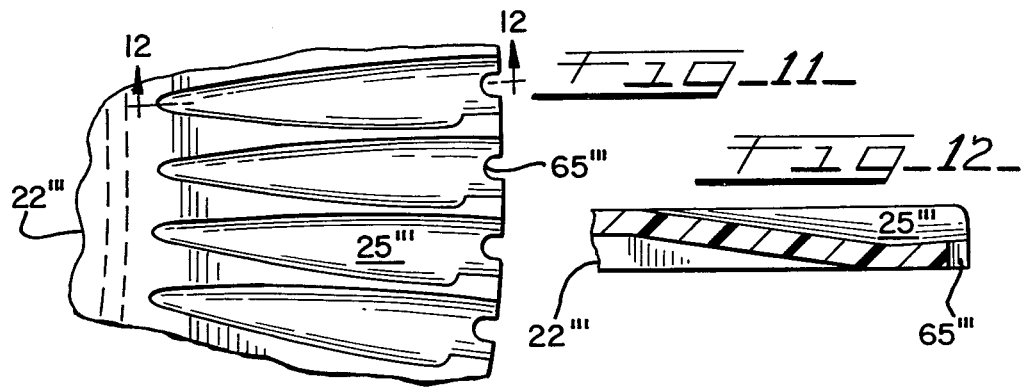

SEED METERING MEANS

This is a continuation of application Ser. No. 178,532, filed Aug. 15, 1980, now abandoned.

SPECIFICATION

This invention relates, generally, to certain improvements in seed metering apparatus for multi-row seed planters such as those shown and described in my prior U.S. Pat. Nos. 3,888,387 and 3,999,690, and in U.S. Pat. No. 4,074,830. More particularly, the present invention relates to certain improvements in such seed metering apparatus which include: improved seed pick-up, and retention until intentional release, of seeds in the seed pockets of the rotating seed disc; improved radial release from the periphery of the rotating seed disc; an improved non-wearing pneumatic seal between the rotating seed disc and the apparatus housing; and, a seed gate for closing off to the desired degree the seed flow and entrance into the seed chamber in the housing.

The object of the invention, generally stated, is the provision of improvements in seed metering apparatus for seed planters of the type disclosed in my prior U.S. Pat. Nos. 3,888,387 and 3,999,690 and in other known seed planters such as shown and described in U.S. Pat. No. 4,074,830.

One important object is an improvement in seed pick-up and retention in the seed pockets of the rotating seed discs used in such seed metering apparatus whereby the tendency to pick-up and retain extra seeds is minimized while the tendency for a properly picked-up seed or seeds to be prematurely dislodged is also minimized.

Another important object of the invention is the provision of an improved non-wearing pneumatic seal between the rotating seed disc used in such seed metering apparatus and a circumferential rim framing a side opening in the housing of the metering apparatus.

Still another important object of the invention is the provision of a manually adjustable seed gate for closing off communication between the seed hopper and the seed chamber in the housing of such seed metering apparatus.

Certain other objects of the invention will become apparent from the following detailed description of a preferred embodiment of the invention taken in connection with the accompanying drawings, wherein:

FIG. 2 is a view, partly in vertical section and partly in elevation, taken on line 2—2 of line 1.

FIG. 3 is an enlarged fragmentary detail sectional view taken on line 3—3 of FIG. 1.

FIG. 4 is an enlarged fragmentary detail sectional view taken on line 4—4 of FIG. 1.

FIG. 7 is a fragmentary elevational view on enlarged scale showing three soybean seed pockets of a rotating seed disc for replacing the corn seed disc shown in FIG. 1.

FIG. 8 is a detail sectional view taken on line 8—8 of FIG. 7.

FIG. 9 is a fragmentary elevational view on enlarged scale similar to FIG. 7 but showing two pockets of a rotating seed disc for sunflower seeds.

FIG. 10 is a detail sectional view taken on line 10—10 of FIG. 9.

FIG. 11 is a fragmentary elevational view similar to FIG. 7 and showing four seed pockets in a rotating seed disc for sorghum seeds.

FIG. 12 is a detail sectional view taken on line 12—12 of FIG. 11.

In as much as the present invention is in the nature of an improvement on the seed metering apparatus described and shown in my prior U.S. Pat. Nos. 3,888,387 and 3,999,690, the disclosures of those patents are incorporated herein by reference. Furthermore, the following description and appended claims will, accordingly, be focused on the improvements provided by the present invention.

Figure 1:
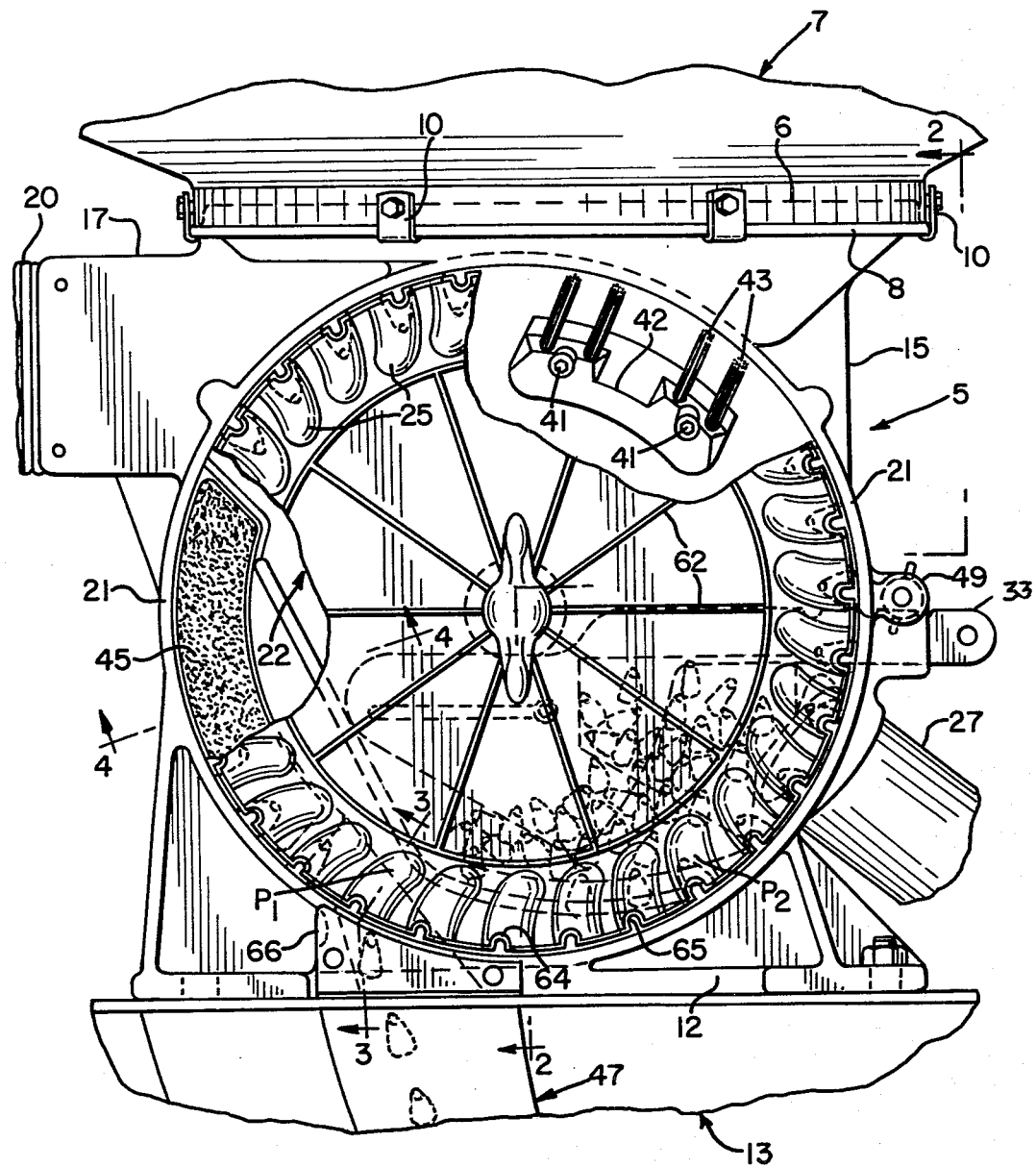
FIG. 1 is a front elevational view, partly broken away, of a seed metering apparatus forming one embodiment of the present invention and showing a portion of a seed hopper at the top and a portion of the planter frame at the bottom.

In FIG. 1, a seed metering apparatus embodying the improvements of the present invention is indicated generally at 5. The circular bottom flange 6 of a seed hopper 7 is detachably secured to the circular upper rim 8 of the metering apparatus 5 by means of a plurality of L-clamps 10—10.

Figure 5:
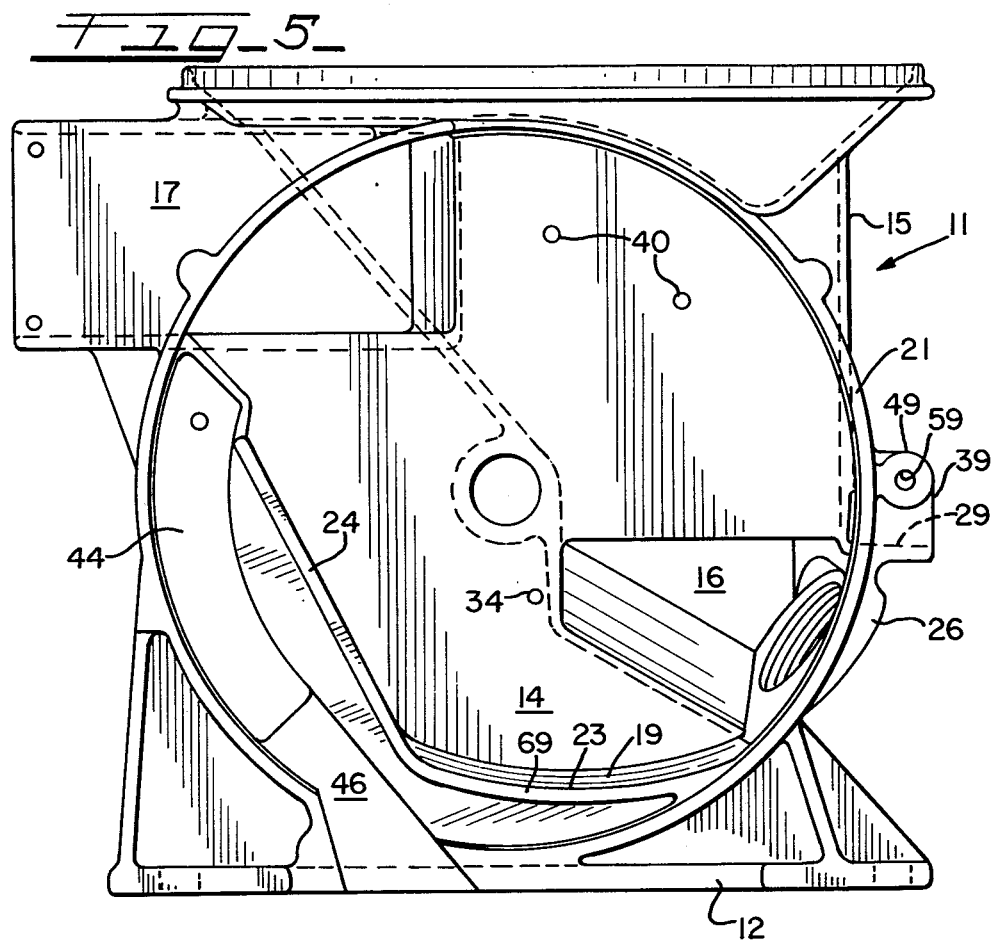
FIG. 5 is a front elevational view of the housing casting of the seed metering apparatus shown in FIG. 1.

The main body of the seed metering apparatus 5 is provided by a housing casting 11 (FIG. 5) the base 12 of which is bolted onto the main frame 13 (FIG. 1) of a seed planter unit. The housing 11 is preferably in the form of a casting having an opening on one side with the lower portion of the opening defining a seed chamber or cavity 14 (FIGS. 2 and 5). The housing casting 11 has a generally vertical gravity feed seed chute 15 at the rear, the upper opening of which communicates with the bottom of the seed hopper 7 and the lower end of which is a vertical entrance opening 16 (FIGS. 2 and 5) communicating with the rear of the seed chamber 14.

Extending horizontally from the upper left-hand portion of the casting or housing 11, as viewed in FIGS. 1 and 5, is a pressurized air inlet 17 having an inner opening into the seed chamber 14 so as to provide for pressurized air to flow and discharge from a flexible corrugated hose 20 (FIG. 1) through the air inlet 17 into the seed chamber 14.

The open front of the housing or casting 11 includes a circumferential rim or flange 21 (FIGS. 4 and 5), the vertical front face of which lies in a substantially vertical plane. The horizontal cylindrical interior surface 61 (FIG. 4) of flange 21 is machined so as to allow the open front face of the housing or casting 11, including the seed chamber or cavity 14, to be closed by a rotating seed disc indicated generally at 22 with a non-wearing circumferential pneumatic seal therebetween to be described in more detail below.

Inset within the lower portion of the circumferential rim 21 (FIG. 5) is an integral ledge-like formation 23 defining the bottom wall of the seed chamber 14 and from the left upper end of which projects or extends a straight integral baffle 24. The front edges of the arcuate ledge formation 23 and baffle 24 are machined and co-planar in a vertical plane so as to have a cooperating relationship with the vertical rear margin of the seed disc 22 as shown in FIG. 2. The upper surface 19 (FIGS. 2 and 5) of the ledge 23 is downwardly inclined.

The function of the baffle or partition 24 is to isolate the seed pockets 25—25 (FIG. 1) in the seed disc 22 from pressurized air within the seed chamber or cavity 14 while the inclined arcuate ledge 23 has the important dual function of (1) gradually exposing the interiors of the seed pockets 25 to the pressure within the cavity or chamber 14 and (2) easing seeds into the respective pockets 25, as will be described.

At approximately the four o'clock position, as viewed in FIGS. 1 and 5, the housing or casting 11 is provided with an interiorally threaded cleanout opening 26 into which a seed cleanout nipple 27 is screwed with the outer end of the nipple normally closed by a cap (not shown).

Figure 6:
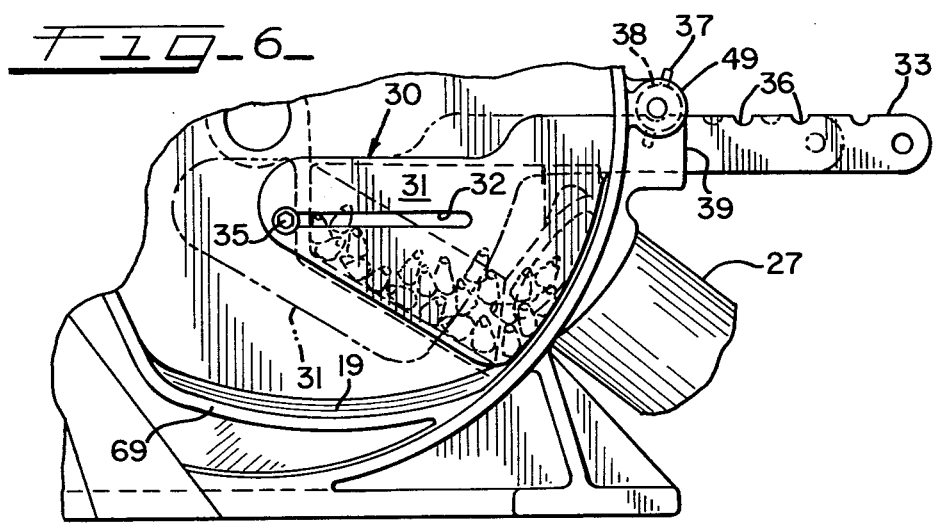
FIG. 6 is a fragmentary front elevational view of a portion of the housing casting of the seed metering apparatus and showing a manually adjustable seed gate mounted thereon in full line in its fully closed position and in broken lines in a partially open position.

An important improvement provided by the present invention is the provision of an adjustable gate 30 (FIG. 6) for totally or partially closing the vertical entrance 16. The seed gate 30 includes a generally sector-shaped gate 31 which includes a horizontal slot 32 therein and from which a horizontally-extending handle or operating lever 33 projects through a vertical slot 29 in the housing 11. The casting 11 is provided with a hole 34 for receiving a screw 35 (FIG. 6) which extends through the slot 32 and the head of which engages the outer face of the vertical plate portion 31 of the gate 30.

The handle 33 projects outwardly to the right (as viewed in FIGS. 1 and 6) through the vertical slot 29 in the sidewall of the casting 11 and just to the rear of an ear 39 including a boss 49 with an apperture 59 therein. Preferably, the upper edge of the handle 33 is provided with a series of semi-circular notches 36—36 for cooperation with a wing screw 37 carried by the housing 11 and provided with an integral washer nut 38 (FIG. 6) which serves to clamp the upper edge of the handle 33 against the boss 49 in any desired position. When the handle 33 is extended outwardly to the point where the left end of the horizontal slot 32 engages the screw 35, the gate 31 of the seed gate 30 completely covers the entrance 16. This allows the particular row planter unit to stop delivering seed on the one hand, without interfering with the operation of remaining planter units on the other hand. By adjusting the position of the gate 30 between fully closed to fully opened, the operator can control the level of seed in the seed cavity or chamber 14 which is advantageous for certain varieties and types of seed. For example, the gate 30 will ordinarily be in its fully opened position for large seeds such as seed corn, in a somewhat closed position for soybeans, and in more fully closed position for small seeds, such as sorghum seed.

The upper rear portion of the housing 11, in generally the one o'clock position, is provided with two holes 40 which receive screws 41—41 (FIG. 1) which secure a brush holder 42 in place. The brush holder 42 carries four pencil-like brushes 43—43 which project upwardly and outwardly toward the front of the housing 11. These brushes 43 will engage and dislodge or remove extra seeds which may happen to be attached to the seed pockets 25 of the rotating disc 22, as will be explained below.

The casting of the housing 11 is provided with an arcuate formation 44 for supporting an arcuate brush 45 (FIG. 1). The projecting ends of the brush 45 will be generally co-planar in a vertical plane and have engagement with the margin of the rotating seed plate 22 in the area of the seed pockets 25. The brush 45 assists in providing a resilient seal which cooperates with the baffle 24 in cutting off pressurized air from the pockets 25. In addition, the bristles of the brush 45 serve to engage and mechanically retain seeds in their respective pockets 25—25 while the air is cut off from the pockets and thereby no longer available to hold the seeds therein. The lower end of the brush 45 terminates at approximately the seven o'clock position, as viewed in FIG. 1, which is the location where the seeds discharge radially from the pockets 25 into the discharge opening 46 communicating with the upper end of the seed drop chute 47 (FIG. 1) of the seed planter. The opening 46 forms an extension of drop chute 47.

The seed disc 22 (FIGS. 1-4) has pockets 25 in the margin which are open at the periphery and toward the seed cavity 14 and which are designed for seed corn. The seed disc 22 has a center hub formation 50 so as to fit over the threaded inner end of a wing screw 51, the outer end of which carries an integrally formed washer 52 and wing head 53. The inner end of the screw 51 is screwed into the tapped outer end 54 of a drive shaft 55 suitably driven in known manner by the seed planter when the unit is in operation and moving over the ground. A hub member 56 fits over the outer end of the drive shaft 55 and has diametric slot openings 57 in the inner end thereof for receiving a drive pin 58 projecting through the drive shaft 55.

It will be seen that when the wing screw 51 is tightened, the collar or washer 52 presses against the outer end of the seed disc hub 50 while the screw 51 draws the seed disc hub 50 to the right clamping the seed disc to the drive hub against the drive pin 58. In this manner, the disc 22 is removably secured on the outer end of the drive shaft 55. The inner vertical margin of the disc 22 is juxtaposed to the front edge 69 of the arcuate ledge 23 as shown in FIG. 2.

The rim 60 (FIG. 4) of the seed disc 22 rotates coaxially within the machined inner surface 61 on the rim 21 of the casting 11 with sufficient clearance therebetween so as to form therewith a pneumatic non-wearing seal between the seed disc rim 60 and the machined surface 61. It will be apparent, particularly from FIGS. 3 and 5, that the rim 21 with its machined surface 61 is interrupted by the discharge opening 46.

Radially inwardly of the margin and pockets 25 the seed disc 22 is generally planar on its inner face and on the exterior is provided with a series of integral reinforcing spokes 62—62 which extend from the hub 50 outwardly to a circular flange 63 (FIGS. 2-4).

The seed pockets 25 are specifically configured for seed corn and, as will be seen from FIGS. 1, 3 and 4, the shallow inner ends of the pockets are slightly inclined or tilted in the direction in which the seed disc 22 rotates in operation, which is in a counter-clockwise direction as viewed in FIG. 1. The seed pockets 25 become gradually deeper until they open up at the periphery of the seed disc thereby allowing seed to discharge radially from the pockets, as illustrated in FIG. 3.

Each of the pockets 25 is provided at its open outer end with a side formation 64 (FIG. 1) with a vent opening 65 therein to allow air under pressure to escape outwardly toward the front of the disc 22.

In operation for planting seed corn, the hopper 7 will be filled with a supply of the seed corn, the seed gate 30 will be moved to its innermost position so as to open up the seed entrance 16 to the widest extent and thereby allow seed corn to flow by gravity from the hopper 7 through the drop chute 15 into the bottom of the seed chamber or cavity 14. The seed disc 22 will rotate counter-clockwise (as viewed in FIG. 1) at a speed proportional to the speed at which the planter unit is propelled over the furrows created by the various planter units. Referring to FIGS. 1 and 3, it will be seen that at the juncture between the baffle 24 and the inclined ledge 23, the pocket P₁ is completely shut off from the pressurized seed chamber 14. However, the seed pocket P₂ is substantially fully open or exposed to the air pressure and seed within the seed chamber 14. The seed pockets 25 intermediate pockets P₁ and P₂ are progressively more fully exposed or opened to the interior of the seed cavity or pocket 14. It has been found that this gradual or progressive exposure or opening up of the inner open sides of the pockets 25 to the seed in the seed chamber 14 and the pressurized air therein substantially tends to lessen the tendency for more than one kernel of corn to be picked up in the pockets 25. The downwardly and outwardly inclined surface 19 also assists entrance of the seed corn into the pockets 25. Furthermore, once a single kernel of corn is picked up in one of the pockets 25, and held against the orifice 65 by pressurized air, the possibility of a second seed or kernel being held at that orifice is substantially reduced. However, should an additional or extra kernel of corn be picked up, as will sometimes happen, the brushes 43 will engage the extra kernel and dislodge it from its pocket.

A kernel of seed corn in its pocket 25 will be retained in place therein by the air pressure and resulting air flow until such time as the pocket reaches the upper end of the arcuate brush 45 and the upper end of the baffle 24, whereupon the pocket will be substantially isolated from the air pressure through the combined action of the brush bristles and the baffle 24. However, the brush bristles are of such dimension and sufficiently dense, as shown in FIG. 4, so as to mechanically retain each seed kernel in place in its pocket until the pocket moves past the lower end of the brush 45 at approximately the seven o'clock position. At this point, the seed kernel is free to discharge radially by gravity and centrifugal force into the opening 46 in the lower portion of the casting 11, the front side of which is closed by means of the cover plate 66 (FIG. 1).

As described in my prior U.S. Pat. No. 3,888,387, the pockets in the seed discs of my seed metering apparatus 5 have different configurations for different types of seed. In FIGS. 7 and 8, pockets 25' are shown which are especially suited for use with soybeans. Each of the pockets 25', in addition to being open at its radially outer end at the periphery of the disc 22', has a side opening 65' adjacent the periphery and an additional opening 70 adjacent its radially inner end. Two soybean seeds at a time tend to be picked up in each of the pockets 25' as it passes sequentially over the arcuate inclined ledge 23.

In FIGS. 9 and 10, a segment of a seed plate 22' is shown having seed pockets 25" having semi-circular side openings 65" adjacent their outer peripheral ends. In FIGS. 11 and 12, a segment of a seed disc 22''' is shown having seed pockets 25''' especially suited for sorghum seed with each pocket having at its outer periphery a side vent opening 65'''.

It will be understood that when the corn seed disc 22 of FIG. 1 is removed and replaced with one of the seed discs 22', 22" or 22''', or some other seed disc, the respective types of seed tend to be picked up in a more positive manner without extra seeds being picked up and with the one or more desired seeds that are picked up being retained in the respective pockets until intentional discharge into the seed chute of the planter from whence they fall down into the bottom of the furrow at regular predetermined intervals.

I claim:

1. In a seed planter for withdrawing seeds from a hopper and depositing the seeds into an underlying furrow at regular intervals, a seed metering apparatus including:

a housing having a side opening framed by an upright circumferential rim with the lower portion of said opening defining a seed chamber;

means comprising a drop chute depending from said housing for discharging seeds into said furrow;

gravity feed means for conveying seeds from said hopper to said seed chamber;

a disc-shaped seed metering member having an inwardly-facing surface with a circumferential margin and a periphery rotatably fitting within said rim and having a plurality of seed pockets in the margin of said disc each dimensioned to receive a predetermined one or more number of said seeds, said metering member being rotatably mounted so as to bring each of said pockets sequentially in communication with said chamber and said drop chute, and each of said pockets being porvided with at least one pressure-relief passageway communicating to the outside of said housing;

means for supplying pressurized air to said seed chamber to urge said seeds into said pockets;

means for at least substantially isolating said pockets from said pressurized air while said pockets are in communication with said drop chute to allow the seeds in said pockets to discharge into said drop chute; and, means for rotating said metering member as said seed planter moves along said furrow;

the improvement, comprising, an elongated pocket-exposing formation in said housing defining a major portion of the bottom wall of said seed chamber with one end thereof being adjacent to where said pockets sequentially enter into communication with said seed chamber, the relative shapes and dimensions of said formation and pockets being such as to progressively expose in a primarily radial direction each of said pockets to the interior of said seed chamber as each pocket passes over said formation while traveling in an arcuate path of substantial length several times longer than the radial length of said pockets.

2. In a seed planter for withdrawing seeds from a hopper and depositing the seeds into an underlying furrow at regular intervals, a seed metering apparatus including:

a housing having a side opening framed by an upright circumferential rim with the lower portion of said opening defining a seed chamber;

means comprising a drop chute depending from said housing for discharging seeds into said furrow;

gravity feed means for conveying seeds from said hopper to said seed chamber;

a disc-shaped seed metering member having an inwardly-facing surface with a circumferential margin and a periphery rotatably fitting within said rim and having a plurality of seed pockets in the margin of said disc each dimensioned to receive a predetermined one or more number of said seeds, said metering member being rotatably mounted so as to bring each of said pockets sequentially in communication with said chamber and said drop chute, and each of said pockets being provided with at least one pressure-relief passageway communicating to the outside of said housing;

means for supplying pressurized air to said seed chamber to urge said seeds into said pockets;

means for at least substantially isolating said pockets from said pressurized air while said pockets are in communication with said drop chute to allow the seeds in said pockets to discharge into said drop chute; and, means for rotating said metering member as said seed planter moves along said furrow;

the improvement, comprising, an elongated pocket-exposing formation in said housing defining a major portion of the bottom wall of said seed chamber where said pockets sequentially enter into communication with said seed chamber and shaped to progressively expose in a generally radial direction each of said pockets to the interior of said seed chamber as each pocket passes over said formation while traveling in an arcuate path of substantial length, said pocket-exposing formation being a generally arcuate ledge the upper end of which coincides with the radially inner ends of the seed pockets and the lower end of which coincides with the radially outer ends of said pockets.

3. The improvement of claim 1 wherein said pocket-exposing ledge formation has an upper surface which is downwardly inclined toward said pockets.

4. In a seed planter for withdrawing seeds from a hopper and depositing the seeds into an underlying furrow at regular intervals, a seed metering apparatus including:

a housing having a side opening framed by an upright circumferential rim having an inner generally cylindrical surface with the lower portion of said opening defining a seed chamber;

means comprising a drop chute depending from said housing for discharging seeds into said furrow;

gravity feed means for conveying seeds from said hopper to said seed chamber;

a disc-shaped seed metering member having an inwardly-facing side surface with a circumferential margin and a periphery with a generally cylindrical outer surface rotatably fitting within and operating in close proximity to said inner generally cylindrical surface in said rim so as to form a pneumatic non-wearing seal therewith and having a plurality of seed pockets in the margin of said disc each pocket being open to said seed chamber and dimensioned to receive one or more of said seeds from within said seed chamber, said metering member being rotatably mounted so as to bring each of said pockets sequentially in communication with said chamber and said drop chute, and each of said pockets being provided with at least one pressure-relief passageway communicating to the outside of said housing;

means for supplying pressurized air to said chamber to urge said seeds into said pockets;

means for at least substantially isolating said pockets from said pressurized air while said pockets are in communication with said drop chute to allow the seeds in said pockets to fall into said drop chute; and means for rotating said metering member as said seed planter moves along said furrow;

said upright circumferential rim and said pneumatic non-wearing seal being co-incidally discontinuous over the upper end of said drop chute so as to allow seeds to discharge from said pockets into said chute;

and, said seed pockets being open at the periphery of said seed disc so that seeds discharge radially therefrom into said upper end of said drop chute.

* * * * *